(12) United States Patent
Nicholson et al.

(10) Patent No.: US 11,130,676 B2
(45) Date of Patent: Sep. 28, 2021

(54) REACTOR PACKING WITH PREFERENTIAL FLOW CATALYST

(71) Applicants: Kelly Nicholson, Buffalo, NY (US); Troy M Raybold, Colden, NY (US); Bo Jin, Orefield, PA (US)

(72) Inventors: Kelly Nicholson, Buffalo, NY (US); Troy M Raybold, Colden, NY (US); Bo Jin, Orefield, PA (US)

(73) Assignee: PRAXAIR TECHNOLOGY, INC., Danbury, CT (US)

(*) Notice: Subject to any disclaimer, the term of this patent is extended or adjusted under 35 U.S.C. 154(b) by 24 days.

(21) Appl. No.: 16/814,121

(22) Filed: Mar. 10, 2020

(65) Prior Publication Data

US 2020/0270129 A1   Aug. 27, 2020

Related U.S. Application Data

(62) Division of application No. 15/658,884, filed on Jul. 25, 2017, now Pat. No. 10,626,014.

(51) Int. Cl.
| | |
|---|---|
| *C01B 3/38* | (2006.01) |
| *B01J 15/00* | (2006.01) |
| *B01J 19/30* | (2006.01) |
| *B01J 12/00* | (2006.01) |
| *B01J 8/02* | (2006.01) |
| *B01J 8/06* | (2006.01) |

(52) U.S. Cl.
CPC ............... *C01B 3/38* (2013.01); *B01J 8/0292* (2013.01); *B01J 8/06* (2013.01); *B01J 8/062* (2013.01); *B01J 12/007* (2013.01); *B01J 15/005* (2013.01); *B01J 19/30* (2013.01); *C01B 3/384* (2013.01); *B01J 2208/00814* (2013.01); *B01J 2208/00938* (2013.01); *B01J 2219/3085* (2013.01); *B01J 2219/30475* (2013.01); *C01B 2203/0233* (2013.01); *C01B 2203/0816* (2013.01); *C01B 2203/1005* (2013.01); *C01B 2203/1011* (2013.01); *C01B 2203/1035* (2013.01); *C01B 2203/1058* (2013.01)

(58) Field of Classification Search
CPC .... C01B 3/38; B01J 8/0299; B01J 8/06; B01J 8/062; B01J 12/007; B01J 12/005
USPC ........................................................ 252/373
See application file for complete search history.

(56) References Cited

U.S. PATENT DOCUMENTS

| | | |
|---|---|---|
| 4,098,587 A | 7/1978 | Krar et al. |
| 4,337,178 A | 6/1982 | Atwood et al. |

(Continued)

FOREIGN PATENT DOCUMENTS

| | | |
|---|---|---|
| CN | 204198673 U | 3/2015 |
| FR | 2419492 A1 | 10/1979 |

(Continued)

OTHER PUBLICATIONS

Hoyt C. Hottel; Flux Distribution Around Tubes in the Radiant Section of Processing Furnaces; 1983 American Chemical Society; Industrial & Engineering Chem Fundam. 1983, vol. 22, No. 2; pp. 153-163.

(Continued)

*Primary Examiner* — Douglas B Call
(74) *Attorney, Agent, or Firm* — Iurie A. Schwartz

(57) ABSTRACT

The present invention relates to reactor tubes packed with a catalyst system employed to deliberately bias process gas flow toward the hot tube segment and away from the cold segment in order to reduce the circumferential tube temperature variation.

13 Claims, 4 Drawing Sheets

(56) References Cited

U.S. PATENT DOCUMENTS

| | | |
|---|---|---|
| 4,340,501 A | 7/1982 | Davidson |
| 4,418,045 A | 11/1983 | Sato et al. |
| 4,740,357 A | 4/1988 | Buswell et al. |
| 7,037,485 B1 | 5/2006 | Drnevich et al. |
| 8,257,658 B2 | 9/2012 | Feinstein |
| 8,409,521 B2 | 4/2013 | Jin et al. |
| 8,721,973 B2 | 5/2014 | Whittenberger et al. |
| 9,216,394 B2 | 12/2015 | Whittenberger et al. |
| 9,403,147 B2 | 8/2016 | Feinstein |
| 2004/0120871 A1 | 6/2004 | De Angelis et al. |
| 2010/0040190 A1 | 2/2010 | Tentarelli |
| 2010/0278700 A1 | 11/2010 | Clawson et al. |
| 2013/0040160 A1 | 2/2013 | Liu et al. |
| 2015/0048277 A1 | 2/2015 | Volpi et al. |
| 2015/0129193 A1 | 5/2015 | Gallarda et al. |

FOREIGN PATENT DOCUMENTS

| | | |
|---|---|---|
| WO | 2004014549 A1 | 2/2004 |
| WO | 2010029323 A1 | 3/2010 |
| WO | 2010029325 A1 | 3/2010 |
| WO | 2014053553 A1 | 4/2014 |

OTHER PUBLICATIONS

M. Sadrameli et al.; Shadow Effect Minimization in Thermal Cracking Reactor Coils Through Variable Cross-Section; Scientia Iranica, vol. 7, No. 2, Sharif University of Technology, Apr. 2000; pp. 137-142.

Geraldine J. Heynderickx et al.; A Pyrolysis Furnace with Reactor Tubes of Elliptical Cross Section; Industrial & Engineering Chemistry Research; American Chemical Society, Washington, DC; vol. 35, No. 7, 1996; pp. 2183-2189.

E.M. Sparrow et al.; Circumferential Variations of Bore Heat Flux and Outside Surface Temperature for a Solar Collector Tube; Department of Mechanical Engineering, University of Minnesota, Minneapolis, MN; vol. 99, Aug. 1977; pp. 360-366.

G.J. Heynderickx et al.; Circumferential Tube Skin Temperature Profiles in Thermal Cracking Coils; AICHE Journal, Dec. 1992; vol. 38, No. 12; pp. 1905-1912.

Related Art

Fig. 3(a)
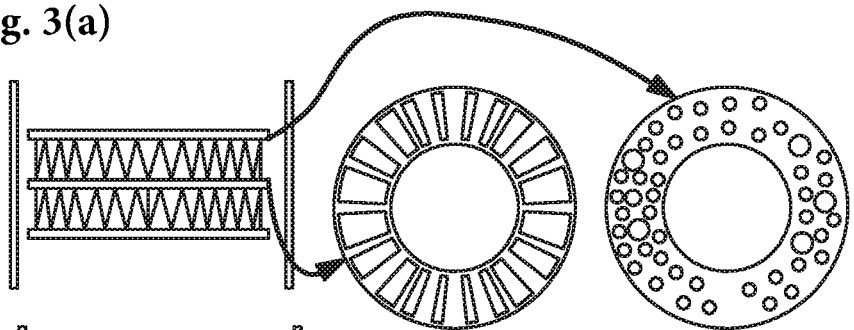
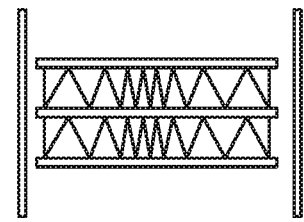
Fig. 3(b)
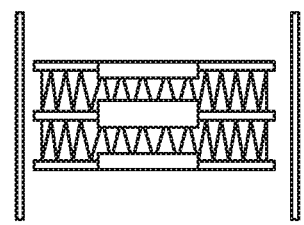
Fig. 3(c)
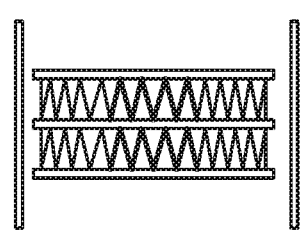
Fig. 3(d)
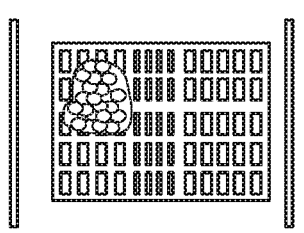
Fig. 3(e)
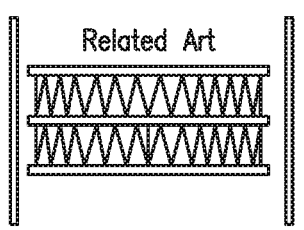 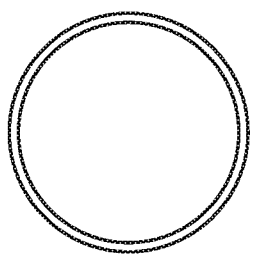
Fig. 3(f)

REACTOR PACKING WITH PREFERENTIAL FLOW CATALYST

CROSS REFERENCE TO RELATED APPLICATION

This application is a Divisional Application of allowed U.S. patent application Ser. No. 15/658,884 filed Jul. 25, 2017, the entire contents of which is incorporated herein by reference in its entirety.

FIELD OF INVENTION

The present invention relates to a reactor tube packed with a catalyst system employed to deliberately bias process gas flow toward the tube wall side of above-average incident heat flux, herein called the "high flux side", and away from the tube wall side of below-average incident heat flux, herein called the "low flux side", and as further defined below, in order to reduce the circumferential tube temperature variation.

BACKGROUND OF THE INVENTION

Steam methane reforming processes are widely used in the industry to make hydrogen and/or carbon monoxide. Typically, in a steam reforming process, a hydrocarbon-containing feed such as natural gas, steam and an optional recycle stream such as carbon dioxide, are fed into catalyst-filled tubes where they undergo a sequence of net endothermic reactions. The catalyst-filled tubes are located in the radiant section of the steam methane reformer. Since the reforming reaction is endothermic, heat is supplied to the tubes to support the reactions by burners firing into this radiant section of the steam methane reformer. Fuel for the burners comes from sources such as purge gas from pressure swing adsorption (PSA) unit and some make-up natural gas. The following reactions take place inside the catalyst packed tubes:

$$C_nH_m + nH_2O <=> (n+0.5m)H_2 + nCO$$

$$CO + H_2O <=> CO_2 + H_2$$

The crude synthesis gas product (i.e., syngas) from the reformer, which contains mainly hydrogen, carbon monoxide, carbon dioxide, and water, is further processed in downstream unit operations. An example of steam methane reformer operation is disclosed in Drnevich et al (U.S. Pat. No. 7,037,485), and incorporated by reference in its entirety.

Conventional operation of steam reformers limits furnace firing to keep reformer tube wall temperatures at or below the maximum allowable working temperature (MAWT) for a given process stress, creep-to-rupture tube life target (often 100,000 hours) and safety margin. For example, an HP-Mod tube in a steam methane reformer furnace could have a design temperature of 1800° F. for 100,000 hours creep-to-rupture target lifetime and a MAWT of 1750° F., providing a 50° F. safety margin. Optimal firing of a steam reformer strikes a balance between maximizing heat transfer and maximizing tube life. This optimal operating point occurs in the idealized scenario when the entire tube surface operates at the MAWT such that the driving force for heat transfer is large and the entire tube fails at once after the design creep-to-rupture tube life target is reached and exceeded.

In reality, tube wall temperatures are not uniform within a reformer, but rather, vary based primarily on the local radiative environment, as well as on the inside tube heat transfer coefficient, the process gas temperature and composition, the catalyst activity, and the tube thermal conductivity.

In reformers the incident heat flux on a catalyst tube varies circumferentially due to tube-tube shielding, wall-shielding, or other radiative effects, inducing a circumferential tube wall temperature gradient. A circumferential tube wall temperature gradient causes non-optimal tube surface utilization for heat transfer and reduced tube life. Local radiative environments are primarily a function of the geometry of the furnace and the respective orientation between relatively hot and cold surfaces. In cylindrical or "can" reformers where the tubes are arranged around the circumference of the furnace with the burner in the center space, the flame-side tube surface can experience significantly more radiative flux and be significantly hotter than the side of the tube facing the refractory wall. Similarly, in box reformers where tubes are arranged in rows with burners firing on either side of the tube rows, the flame-side of the tube receives significantly more radiative flux than the tube side facing either a refractory wall or another tube. Typically, the flame side of the tube surface is hotter than the tube sides receiving less incident radiative flux. This temperature variation is referred to as a "shielding" or "shadowing" effect in the art. Local radiative environments also vary based on elevation within the furnace. For example, the circumferential variation may be stronger in the top 50% of a down-fired furnace than in the bottom due to the presence of peak flame temperatures at the furnace inlet. These circumferential tube temperature variations lead to a condition in which some areas of the tube operate with less thermal driving force for heat transfer. The reformer as a whole is bottlenecked by the hottest tube wall temperatures up to the MAWT, which may only be observed over a small portion of the tube.

An existing need remains for technologies that can maximize the utilization of the tube heat transfer surface through the elimination of the circumferential variations, enabling maximal reformer throughput and furnace efficiency for a given tube life. Altering the local radiative environment in a given furnace can be capital intensive, potentially requiring physical rearrangement of installed tubes and walls, burner changes, or header system reconfigurations, etc. or can be impractical due to limitations in flange spacing requirements, etc. Reducing tube temperatures from the process side (i.e., inside the tube) can be achieved through the utilization of catalysts that promote higher heat transfer or that have higher activity such as structured catalysts or specially-shaped pellets. Raising/lowering tube temperatures through the adjustment of bulk flow rates through individual tubes is known in the art. Even using differential loadings of catalyst beds with different pressure drop characteristics to achieve this biasing of flow to different tubes in the reformer is known. However, conventional catalysts are either randomly packed pellets or structured catalyst with uniform horizontal cross-section, with the intention to distribute process flow evenly across the tube cross-section and so do not address the problem of circumferential tube temperature variations directly in the localized way of the present invention.

In the related art, methods to reduce circumferential tube temperature variations have primarily been focused on modifying the furnace-to-tube radiant heat transfer. For instance, some attempts are Krar et al and Buswell et al (U.S. Pat. Nos. 4,098,587 and 4,740,357, respectively) through the use of flue gas radiant shields or through the use of elliptical tubes rather than circular tubes as shown in Heynderickx and Froment "A Pyrolysis Furnace with Reactor Tubes of Elliptical Cross Section" (1996) Ind. Eng. Chem. Res. 35 pp. 2183-2189 and Sadrameli et al "Shadow Effect Minimization in Thermal Cracking Reactor Coils through Variable Cross-Section" Scientia Iranica, Vol. 7, No. 2 pp. 137-142. These disclosures rely on controlling the external tube surface heat exchange with the furnace either through manipulation of the external tube surface exposure to radiant heat transfer or hot flue gases whereas the current invention deliberately targets controlling the internal tube heat transfer through the process gas flow pattern.

Several techniques have been brought forward that target increased heat transfer within a steam reformer tube, but do not address the circumferential tube temperature variation. For example, Whittenberger et al, Whittenberger et al and Jin et al (U.S. Pat. Nos. 9,216,394; 8,721,973, and 8,409,521, respectively) disclose designs for structured catalyst that increase the inside tube wall convective heat transfer coefficient by directing process gas into the inside tube wall. Other related art discusses the modification of pellet catalysts to increase radial mixing and heat transfer through the tube cross section. See, Combs, Birdsall et al, and Cairns et al (International Patent Publication Nos. WO 2004/014549, WO 2010/029323, and WO 2010/029325, respectively). Yet other related art discloses the use of particular pellet catalyst shapes intended to modify the inside tube wall heat transfer coefficient. See, Camy-Peyret et al (International Publication No. WO 2014/053553). These designs reduce the maximum tube wall temperature through overall higher heat transfer delivered to the process gas and increased reforming. However, these designs do not deliberately bias process gas toward any particular side of the tube wall. As a result, a circumferential tube temperature gradient still exists, limiting the operation of the reformer to the hottest temperature observed on a given side of the tube.

Sato et al (U.S. Pat. No. 4,418,045) and De Angelis et al (U.S. Patent Application Publication No. 2004/0120871A1) disclose the use of catalytic seals (e.g., pellet catalyst, fibrous catalyst, fabric catalyst, etc.) around the periphery of a structured catalyst bed in order to prevent flow from bypassing structured catalyst along the reactor wall. However, these seals are intended to prevent bypass flow between structured catalyst modules rather than bias flow toward the high flux side of the tube wall.

Thus, to overcome the disadvantages of the related art, one of the objectives of the present invention is to provide a reactor tube with a preferential flow catalyst with a structural element where the process gas flow is directed toward the portion of the tube wall that receives higher incident heat flux to reduce the peak tube temperature.

It is another objective of the present invention that the circumferential tube temperature is reduced by utilizing a catalyst with a structural element that imparts a non-uniform and non-random pressure drop to the process gas flow, which causes a larger portion of the process gas to flow into and react at the portion of the tube wall that receives the highest incident heat flux, and a lesser portion of the process gas to flow into and react at the side of the tube that receives relatively less incident heat flux.

Other objects and aspects of the present invention will become apparent to one skilled in the art upon review of the specification, drawings and claims appended hereto.

SUMMARY OF THE INVENTION

This invention pertains to a reactor tube packed with a catalyst system employed to deliberately bias process gas flow toward the tube wall side of above-average incident flux, and away from the tube wall side of below-average incident flux, in order to reduce the local maximum tube temperature and, preferentially, to reduce the circumferential tube temperature variation. In one aspect of the invention, method of producing synthesis gas within a tubular reformer is provided. The method includes introducing a process gas, where the process gas comprises steam and at least one hydrocarbon at an inlet of one or more tubes disposed in the reformer, contacting the process gas with a catalyst in the interior of the one or more tubes, wherein at least a portion of the catalyst has a structural element that circumferentially biases a process gas flow toward at least one tube wall side of greater incident heat flux thereby reducing the maximum tube wall temperature, and removing a reformed process gas at an outlet of the one or more tubes wherein the reformed process gas is a synthesis gas containing predominantly hydrogen, carbon monoxide, carbon dioxide, and water.

In another aspect of the invention, catalyst with a structural element disposed in the interior of one or more tubes within a tubular reformer is provided. The catalyst includes a structural element that biases a localized process gas flow, where the process gas stream comprises steam and at least one hydrocarbon, toward the at least one tube wall side of greater incident flux.

BRIEF DESCRIPTION OF THE DRAWINGS

The above and other aspects, features, and advantages of the present invention will be more apparent from the following drawings, wherein:

FIG. 3(a) is a schematic representation of select method to impart a biased flow to process gas across a tube cross-section that has flow resistance elements between catalyst layers;

FIG. 3(b) is a schematic representation of select method to impart a biased flow to process gas across a tube cross-section that has an increasing fan fold density;

FIG. 3(c) is a schematic representation of select method to impart a biased flow to process gas across a tube cross-section that has flow resistance elements attached to the structure walls;

FIG. 3(d) is a schematic representation of select method to impart a biased flow to process gas across a tube cross-section that has flow resistance elements in the form of thicker structure walls;

FIG. 3(e) illustrates an embodiment, which has a reduction in window number and/or size at catalyst periphery in systems where pellets are supported in structural baskets within tubes; and FIG. 3(f) illustrates a related art embodiment where an unmodified fan has a uniform gas flow path area around the structured catalyst circumference.

DETAILED DESCRIPTION OF THE INVENTION

Figure 1A:
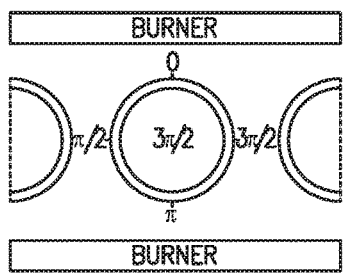
FIG. 1(a) is a depiction of a related art reformer with the orientation of the majority of tubes in the interior rows of a box reformer ("inner row, interior tube")
Figure 1B:
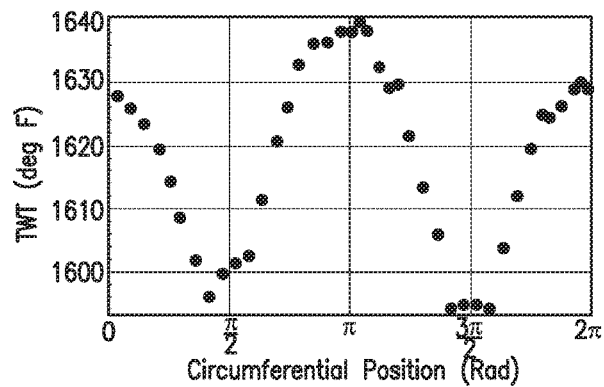
FIG. 1(b) illustrates circumferential tube wall temperatures for an inner row, interior tube of a related art box reformer.
Figure 1C:
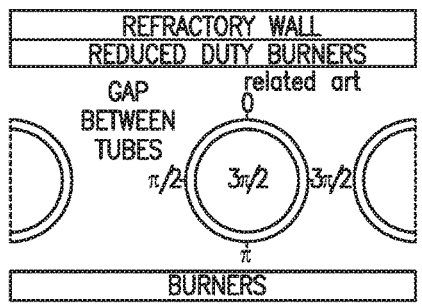
FIG. 1(c) is a schematic representation of the orientation of tubes adjacent to a gap and located in an outer row with burners firing at reduced rate in a related art top-fired box reformer ("outer row, gap tube")
Figure 1D:
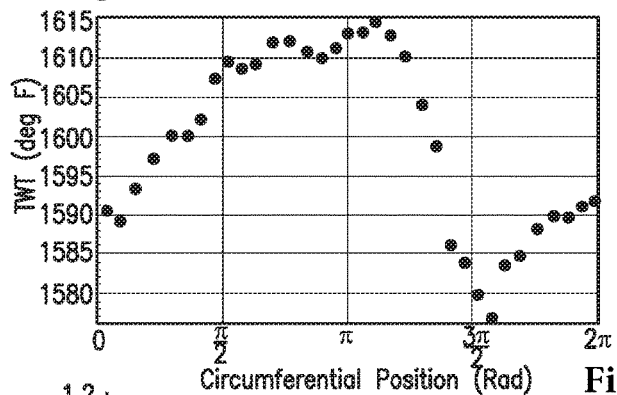
FIG. 1(d) illustrates circumferential tube wall temperatures for an outer row, gap tube of a related art box reformer.

The present invention provides a more efficient heat transfer to the process gas in a reformer at a given feed rate and process gas outlet temperature over and above what can be achieved through the related art that has no process gas flow bias within a tube. For a given elevation, the local convective heat transfer at the inside tube wall surface is matched to the local incident flux on the adjacent outer tube wall surface, yielding a lower maximum tube wall temperature for a given process outlet condition and reduced circumferential temperature gradients. In this manner, a greater portion of the tube surface area operates closer to the optimal conditions for maximum heat transfer to the process gas, fully utilizing the tube heat transfer surface. Circumferential temperature gradients can lead to hoop stresses in the tube materials, but importantly represent non-optimal usage of tube heat transfer surface. In reformer tubes where the catalyst provides no bias to the process gas flow (i.e., the related art), higher tube wall temperatures indicate surfaces with greater incident flux that is unmatched by a suitable uptake of heat on the process side. It is the aim of this invention to use a catalyst system with a structural element to match the given circumferential variations in the incident flux on an outside tube wall to a deliberate variation in the circumferential convective heat transfer at the inside tube wall, thus reducing the peak tube wall temperature and/or reducing the circumferential tube temperature gradient.

By way of explanation, FIG. 1 of the related art illustrates the circumferential variation in the tube wall temperature induced by local radiative and convective heat flux environments for tubes in box and can reformers. As shown in FIG. 1(a), the top view of an inner row tube in a typical box reformer is provided. Each individual tube has two sides facing the adjacent interior tubes and two sides facing burner rows. FIG. 1(b) illustrates a computational fluid dynamics (CFD) simulated circumferential tube wall temperature profile (i.e., temperatures as a function of theta ($\theta$)) of reformer tube at approximately one third of the way down the fired length of a top-fired box reformer. This tube is adjacent to two similar tubes in the tube row plane and adjacent to two burner rows firing at similar rates, as shown in FIG. 1(a). The outside tube wall temperature is highest at $\theta=0$ and $\pi$, which are the areas directly facing the flames. The circumferential temperature range is greater than 40° F. with 75% of the tube surface underutilized and operating at temperatures of more than 10° F. below the flame-side temperature, which ultimately limits reformer operation. While this particular tube local radiative environment leads to a largely symmetric circumferential tube temperature profile, this is not a general rule. With reference to FIG. 1(d), a CFD simulated circumferential tube wall temperature profile is depicted (i.e., as a function of theta ($\theta$)) for a tube at the same elevation as in FIG. 1(b), but located in an outer row and next to a gap in the tube row, commonly referred to as a "gap tube". As illustrated in FIG. 1(c), each side of this tube is adjacent to a unique radiative environment and so the circumferential temperature profile is asymmetric.

Figure 1E:
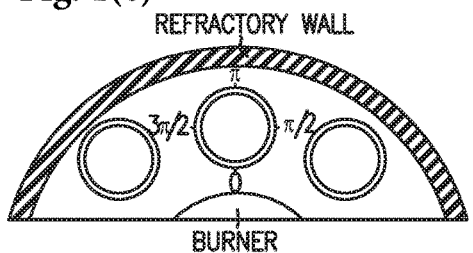
FIG. 1(e) is a schematic representation of the orientation of tubes in a related art cylindrical—or can—reformer.
Figure 1F:
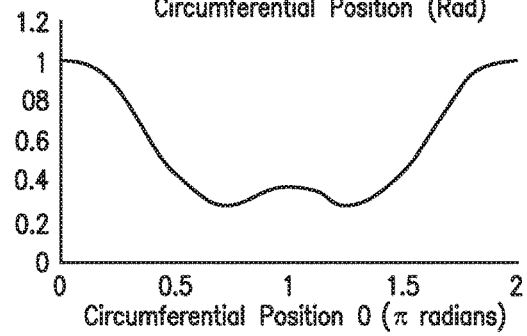
FIG. 1(f) illustrates the ratio of incident local flux density at the outside tube surface to the maximum tube flux around the circumference of a related art cylindrical reformer tube.

FIG. 1(f) shows the incident radiative flux along the circumference of a tube in a cylindrical or can reformer of the related art. Specifically, the ratio of incident local flux density to the maximum tube flux around the circumference of the outside tube surface of a cylindrical reformer tube is depicted. As shown in FIG. 1(e), the tubes in these can reformers have one side facing the flame, one side facing the refractory wall, and two sides facing adjacent tubes. The maximum radiative flux occurs at the flame side of the tube.

Figure 2:
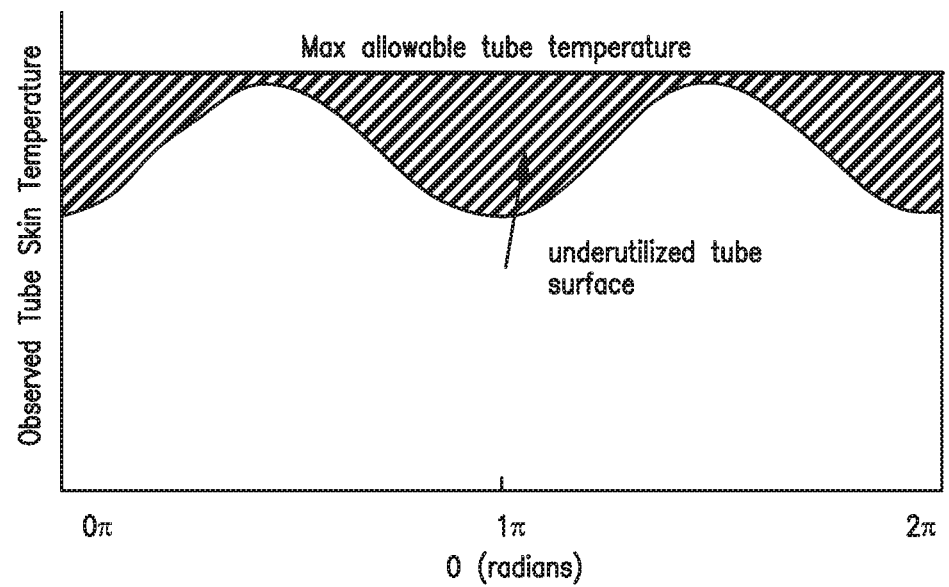
FIG. 2 is a plot depicting tube wall temperature for an inner row, interior tube in a box reformer relative to the maximum allowable tube wall temperature.

As shown in FIG. 2, portions of the tube surface that operate below the MAWT are underutilized for heat transfer since, in practice, reformer firing is limited by the MAWT in order to achieve a desired tube life. In the present invention, the process gas flow is employed to flatten out the observed tube wall temperatures to a temperature at or below the MAWT. In other words, the peaks shown in FIG. 2, are decreased and the valleys are raised. This achieves a margin between the maximum observed tube temperature and the MAWT, of which operators can take advantage. In some cases, the peaks can be reduced below the MAWT, giving operators room to take advantage, but the minimum skin temperatures are also reduced. This can occur if the effect on two dimensional conduction of heat through the tube wall from the side of greater incident flux to lesser incident flux is larger than the effect on convective heat transfer at the side of lesser incident flux. For example, this can happen if a greater portion of flow directed toward the side of greater incident flux causes a substantially reduced tube temperature, which in turn reduces the driving force for two-dimensional heat conduction to the side of lesser incident flux, such as in a very thick tube wall. Depending on the balance between the convection and conduction effects at the side of less incident flux, the minimum tube skin temperature may raise or lower, but the maximum skin temperature will be reduced, providing net benefit.

The objective of the present invention is to reduce the peak tube wall temperatures to at or below the MAWT and, preferably, to reduce the variance in the circumferential temperature profile. To achieve this, a greater portion of process gas flow is directed toward the portions of tube wall receiving the highest incident heat flux, and a lesser portion of process gas is directed toward the tube wall sides receiving a lesser heat flux. As utilized herein the terms "high flux side" or "high incident heat flux" of a tube are interchangeable and shall mean the region of an outside tube wall that receives an above average level of incident radiative and convective heat flux from the furnace, where the average is taken as the circumferential average for that given tube and elevation. In the present invention, a portion of process gas is biased toward this side, thereby increasing the process-side local convective heat transfer coefficient and lowering the local tube wall temperature.

The "low flux side" or "less incident heat flux" are interchangeable and shall mean the region of an outside tube wall that receives a below average level of incident radiative and convective heat flux from the surface, where the average is taken as the circumferential average for that given tube and elevation. A portion of process gas is biased away from this side, thereby lowering the local convective heat transfer coefficient and increasing the local tube wall temperature. This reduces both the range in circumferential tube wall temperatures and the maximum tube temperature at a given elevation. This flow bias cannot be achieved through the use of conventional randomly-packed pellet catalyst or through structured catalyst systems that are circumferentially-uniform. These conventional systems are designed to impart a uniform pressure drop to the process gas flow such that the flow is circumferentially-even. In order to achieve the flow bias that is the objective of this invention, it is required to provide a catalyst system with an engineered structural element. The structural element can take many forms, some exemplary embodiments of which are discussed below.

Biasing the process gas flow to the high flux tube wall sections increases the local inside tube wall convective heat transfer coefficient, thereby increasing heat transfer to the local process gas. This increased heat transfer and endothermic reaction will reduce the tube wall temperature at the tube sections with greatest incident flux. Preferably, flow is simultaneously reduced toward tube sections with less incident flux, decreasing the convective heat transfer coefficients, heat transfer, and endothermic reaction locally inside the tube. Together, these will serve to raise the local tube temperature at the side of the tube receiving less flux and overall balance the circumferential tube temperature. For the same process gas flow, outlet pressure, and process gas exit temperature, the maximum tube wall temperature observed along the tube surface will be reduced. This indicates increased furnace efficiency and offers an opportunity to either bank fuel savings or increase reformer throughput.

The local inside tube convective heat transfer coefficient largely governs the rate of heat transfer from the tube wall to the process gas. The local inside tube wall convective heat transfer coefficient is proportional to the Reynolds number raised to power x $$h_{tc} \sim Re_\theta^x$$

where x depends on the mode of heat transfer from the catalyst to the wall. Typical values of x in steam methane reformers range from 0.6 to 0.8. The local Reynolds number depends directly on the local velocity via $$Re_\theta = \frac{\rho V L}{\mu}$$

where $\rho$ is the local fluid density, V is the local velocity, L is a characteristic length, and $\mu$ is the local fluid viscosity. In the present invention, the structural element of the catalyst can be designed such that the radial velocity of gas impinging on the tube wall is proportional to the local radiant and convective flux incident upon the tube, which can be determined a priori, for example, either through furnace observation or calculation with methods such as CFD. For values of x between 0.4 and 1, modifications to the catalyst should be made such that the ratio $V_{high}/V_{low}$ ranges from 1 to 2.2 where $V_{high}$ and $V_{low}$ are the velocities at the tube wall sides receiving greater and lesser incident flux, respectively. Using an engineered structural element within the catalyst system, the local process gas velocity can be adjusted to tune the local inside tube heat transfer coefficient around the circumference of the inside tube wall to match the local incident flux. Such local velocity adjustments cannot be achieved through the related art randomly-packed pellet or uniform structured catalyst systems.

With reference to FIG. 3, the preferred embodiments of the method and the catalyst with a structural element are provided for designing a system to bias flow toward the tube wall sides with highest incident flux. In some cases, conventional structured catalyst or structured catalyst cages for pellets can be used as a basis for the preferential flow design, but the invention is not limited to only the designs shown in FIG. 3. In many cases, the structure element may be coated with a suitable steam reforming catalyst known in the art, or alternatively the catalyst itself is structurally designed to bias the flow in accordance with the invention. FIG. 3a depicts a preferred embodiment utilizing flow resistance elements between catalyst layers to direct flow preferentially toward the sides of the tube wall with greatest incident flux. Examples of such flow resistance elements are shown as modified washers separating two catalyst fans in which the flow resistance through the washer varies circumferentially. The included examples are in the form of a grate or a perforated plate though other embodiments are possible. A greater portion of the flow passes through the sides of the washer with greater open cross-sectional area and least flow resistance, toward the tube wall with greater incident flux.

FIGS. 3(b), 3(c), and 3(d) depict preferred methods of reducing the cross-sectional area for channels adjacent to tube walls with relatively lower incident radiative flux. This can be accomplished by increasing the density of channels or folds open to the direction of the portion of the tube receiving less incident flux as in FIG. 3(b), by partially blocking channels at the periphery of the catalyst as in FIG. 3(c), or by using thicker walls for channels open to the direction of the colder inside tube walls as in FIG. 3(d). Increasing the cross-sectional area available for flow preferentially toward the high flux side of the tube and increasing the resistance to flow in the direction of the low flux side of the tube, a greater portion of process gas will tend to flow toward the high flux tube side. The degree of reduction in cross-sectional area needed to adjust the circumferential temperatures based incident flux can be determined a priori using either experimental methods or calculation (e.g., with CFD tools).

The circumferentially-non-uniform folds such as those shown in FIG. 3(b) are most preferably formed in the initial fan-forming or metal corrugating process so as to maintain a uniform height of each fan. A uniform height ensures that that the fans can be stacked upon each other to fill the length of the tube to be filled with catalyst. The circumferentially non-uniform folds should be made from a material that is sufficiently sturdy so as to maintain the folds at high temperature and through repeated thermal cycles, typical of steam methane reformer operation.

FIG. 3(c) describes a preferred embodiment of increasing the resistance to flow toward the sides of the tube with less incident flux via the attachment of flow resistance elements to the peripheral walls of the structured catalyst. These elements partially impede the flow of process gas through channels leading toward tube walls with less incident flux, thus, allowing a greater portion of the process gas to flow toward the high flux tube side with no flow resistance element. In this particular embodiment, the resistance elements are attached to the outside wall of the structure, maintaining a gap between the catalyst and the inside tube wall. This allows the elements to be attached in a post-modification process via tack welding or other processes known to those skilled in the art. However, other embodiments can be envisioned in which the flow resistance elements are attached at the interior walls either at the initial construction of the structured catalyst or in a post-formation modification process or in which select flow passages are filled solid.

FIG. 3(e) illustrates a modification to types of reforming catalyst systems of the related art designed to operate with pellet catalyst, but that enhance heat transfer at the inside tube wall using a structure which may or may not be coated with catalyst. The current invention modifies such a pellet-structure system to either reduce the relative sizes of holes in the structure open to tube wall sides of lesser incident flux as shown, or reduce the number of holes open to the lower flux side of the tube. In this embodiment, a greater portion of process gas is deliberately biased toward the higher flux tube wall sides to reduce peak tube wall temperature while preferably reducing flow at the lower flux side simultaneously to reduce the circumferential tube temperature variation. The sizes of holes in the structure need not be uniform, but can be designed to match the incident heat flux at a local tube wall side such that the peak temperatures are reduced and the circumferential tube temperature variation at a given elevation is minimized. In the foregoing embodiments the use of a tool like CFD to match the catalyst structure adjustments to the local incident flux at the outside tube wall is preferred.

In all cases, the structural element has an open arrangement that allows all portions of process gas to be maintained in fluid contact to encourage mixing. It is not preferable to utilize structures or catalyst systems with defined channels that do not allow for the periodic recombination of process gas portions over the length of the tube.

If the catalytic surface area is reduced too much in the direction of the higher flux side wall, the amount of catalyst available to react the now larger portion of process gas may be too low to achieve the desired conversion. For example, this can happen if the channels of a structure such as that shown in FIG. 3(b) are coated with catalyst, but the circumferential density of channels is too low to provide the necessary catalytic surface area. Therefore, the design modification to the structured catalyst that achieves this reduction in circumferential tube temperature variation should be balanced with ensuring sufficient catalytic surface area is available for reaction. One way to compensate for a reduction in catalytic surface area per unit of process gas volumetric flow in the direction of the high flux tube wall is to apply additional coats of catalyst or increase the catalyst loading (e.g., wt % Ni per unit substrate surface area) on these channel walls, thereby increasing the catalytic surface area.

There are a number of ways to use catalyst with a structural element to bring about the circumferential biasing of process gas flows: In an exemplary embodiment, structured catalyst flow channels are narrowed to preferentially direct flow away from these channels. In another exemplary embodiment, flow resistance elements are inserted within channels to preferentially direct flow away from these channels. These elements may or may not be coated with catalyst. In another exemplary embodiment, flow resistance elements or baffles are employed between structure channels and the inside tube wall to partially block flow through these channels or between the channels themselves. These elements may or may not be coated with catalyst. In yet another exemplary embodiment, a combination of two or more of these methods is used in concert. In another embodiment, the type and/or cross-section of the structural element of the catalyst system is varied along the length of the tube and/or from tube to tube based on the local incident circumferential heat flux on the tube. Some tubes or some portions of tubes may not incorporate biasing structural elements but rather utilize conventional catalyst. In yet another exemplary embodiment, the catalyst systems in which pellet catalyst are supported within a structure with flow openings that direct the process gas into the inside tube wall have either more holes or larger holes to direct more flow toward the tube wall side receiving higher flux compared with the sides of the structure that direct flow to the portion of the tube wall receiving less flux.

In a further embodiment, one of these methods for preferentially biasing flow is used and the catalytic activity is increased in the direction of more gas flow. This can be accomplished, for example, by using higher active metal loadings in the catalytic coatings of structured catalyst or by using pellet catalyst with higher catalytic surface area. The catalyst is designed to induce a circumferential bias in process gas flow and may fill the entire tube length or may be utilized in only a portion of the tube (e.g., where tube wall temperatures are highest), wherein up to the remainder of the tube is filled with conventional unbiased structured catalyst, pellet catalyst, or a combination thereof.

In a further embodiment, the catalyst is designed to induce a circumferential bias in process gas flow can be installed in all or in only particular types of tubes (e.g., end tubes, corner tubes). If needed, a mechanical mechanism is used to fix the structured catalyst into place and prevent rotation during operation.

The invention is further explained through the following example, which compares the base case with a standard design at the outlet tube, and those based on various embodiments of the invention, which are not to be construed as limiting the present invention.

Comparative Example

Figure 4A:
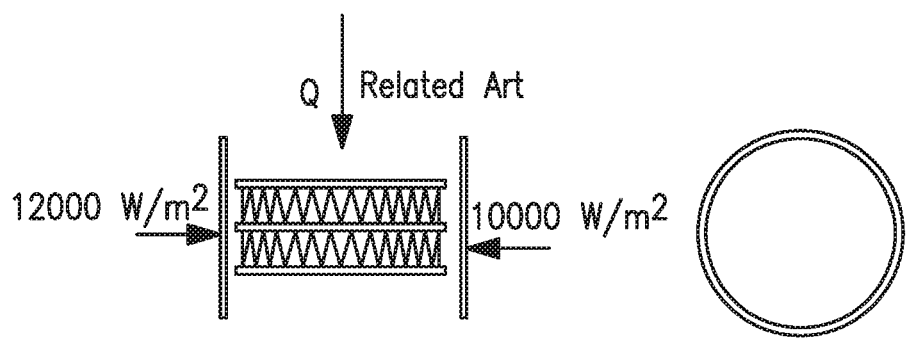
FIG. 4(a) is a schematic representation of an example CFD simulation where there's no modification to catalyst structure (i.e., related art) to impart circumferential flow bias.
Figure 4B:
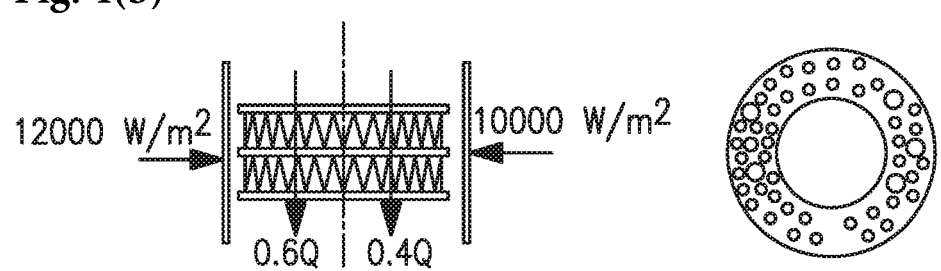
FIG. 4(b) illustrates an embodiment that has flow resistance elements included between catalyst layers to bias flow.

This example illustrates how the insertion of flow resistance elements between two catalyst layers can be used to bias flow toward the tube wall with greater incident flux and achieve a reduction in both the spread of the circumferential tube temperatures as well as the maximum tube temperature. Computational Fluid Dynamics (CFD) was used to simulate the non-uniform heat flux around a reformer tube wall such as might be found in an up-fired cylindrical reformer tube. Boundary condition heat fluxes of 12000 $W \cdot m^{-2}$ and 10000 $W \cdot m^{-2}$ were each applied to one half of the tube metal skin as shown in FIG. 4. This condition mimics the case for one side of the tube wall facing the flame with higher incident flux and one side facing other tubes or the furnace refractory wall with less incident flux. Cases without circumferential flow bias (FIG. 4(a)) and with modifications to impart circumferential flow bias (FIG. 4(b)) through the addition of inter-layer flow resistances were simulated to show impact. A consistent total inlet flow rate was applied in both cases. In order to bias flow preferentially toward the side with highest incident flux, flow resistances were applied between catalyst layers such that 60% of the incoming flow, Q, was directed toward the tube side with higher incident flux and 40% was directed toward the side with less incident flux, as shown in FIG. 4(b). These flow resistances can be achieved via many methods, two of which are shown in FIG. 3(a).

As shown in Table 1, below, using flow resistance elements to bias flow toward the side of the tube with greater incident flux reduces the maximum tube temperature by 23° F. and reduces the variation in the tube skin temperatures from 58° F. to 35° F. The MAWT for this simulated tube is set at 1775° F. In the case with no flow bias, as in FIG. 4(a), there is no margin between the maximum tube temperature and the MAWT, limiting furnace efficiency and throughput. However, using the catalyst with a structural element that imparts a flow bias achieves a 28° F. margin between the MAWT and the maximum tube temperature, which allows the reformer operator to, for example, increase throughput or take advantage of increased tube life.

TABLE 1

| Case | No modification | Flow resistance between catalyst layers |
|---|---|---|
| maximum tube skin temperature (° F.) | 1775 | 1747 |
| minimum tube skin temperature (° F.) | 1718 | 1712 |
| skin temperature spread (° F.) | 58 | 35 |
| average skin temperature (° F.) | 1746 | 1723 |

CFD simulation of reduction of circumferential tube skin temperature variation and maximum skin temperature using flow resistance elements between catalyst layers to bias flow toward tube wall with greatest incident flux.

Although various embodiments have been shown and described, the present disclosure is not so limited and will be understood to include all such modifications and variations as would be apparent to one skilled in the art.

We claim:

1. A catalyst with a structural element disposed in the interior of one or more tubes within a tubular reformer, comprising: a structural element that circumferentially biases a process gas flow, where the process gas stream comprise steam and at least one hydrocarbon, toward the at least one tube wall side of greater incident heat flux.

2. The structural element of claim 1, wherein the structural element directs flow away from tube wall sides of lesser incident heat flux.

3. The structural element of claim 1, wherein the structural element is a flow resistance element disposed between catalyst sections along the length of the tube.

4. The structural element of claim 3, wherein the flow resistance elements are perforated plates or grates with circumferentially non-uniform open channels.

5. The structural element of claim 3, wherein the flow resistance elements have a lesser flow resistance toward the sides of the tube with greater incident flux, thereby biasing flow toward these tube wall sides.

6. The structural element of claim 5, wherein the flow resistance elements have a greater flow resistance toward the sides of the tube with lesser incident heat flux, thereby biasing flow away from these tube wall sides.

7. The catalyst with a structural element of claim 1, wherein the catalyst is in pelletized form supported by the structural element where said element is a perforated metal basket having non-uniform flow openings that preferentially directs flow.

8. The structural element of claim 7, wherein a greater portion of flow opening is disposed adjacent the tube wall sides with greater incident heat flux.

9. The structural element of claim 7, wherein a lesser portion of flow opening is disposed adjacent the tube wall sides with less incident heat flux.

10. The catalyst with a structural element of claim 7, wherein the catalyst activity is increased in the direction of biased gas flow by employing a pellet catalyst with higher catalytic surface area on the tube sides with greater incident heat flux than on the tube sides with lesser incident heat flux.

11. The catalyst of claim 1, wherein the structural element is coated with said catalyst.

12. The structural element of claim 1, wherein the structural element is a flow resistance element that is selected from the group comprising of fan folds, thickened baffles, and structural baskets.

13. The catalyst with a structural element of claim 1, wherein the catalytic activity is increased in the direction of biased gas flow by employing a catalyst with higher active metal loading on the tube sides with greater incident heat flux than on the tube sides with lesser incident heat flux.

* * * * *